United States Patent
Romesburg et al.

(12)

(10) Patent No.: US 6,487,178 B1
(45) Date of Patent: Nov. 26, 2002

(54) METHODS AND APPARATUS FOR PROVIDING VOLUME CONTROL IN COMMUNICATING SYSTEMS INCLUDING A LINEAR ECHO CANCELER

(75) Inventors: Eric Douglas Romesburg, Chapel Hill, NC (US); Thomas John Makovicka, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/310,100

(22) Filed: May 12, 1999

(51) Int. Cl.⁷ .................................................. H04M 9/08
(52) U.S. Cl. ............... 370/286; 379/406.7; 379/406.09; 379/406.15; 379/406.16; 704/225; 704/226; 381/104
(58) Field of Search ................................ 370/276, 277, 370/278, 282, 286, 288, 289; 379/406.01, 406.02, 406.05, 406.07, 406.08, 406.09, 406.15, 406.16, 406.06; 381/104, 106, 109; 704/200, 226, 225

(56) References Cited

U.S. PATENT DOCUMENTS

| | | | |
|---|---|---|---|
| 4,984,265 A | | 1/1991 | Connan et al. |
| 5,016,271 A | | 5/1991 | Ford |
| 5,636,323 A | | 6/1997 | Umemoto et al. |
| 5,696,819 A | * | 12/1997 | Suizu et al. ............... 370/286 |
| 6,088,461 A | * | 7/2000 | Lin et al. .................... 381/104 |
| 6,212,273 B1 | * | 4/2001 | Hemkumar et al. ........ 379/392 |

FOREIGN PATENT DOCUMENTS

| | | |
|---|---|---|
| EP | 0 515 242 A | 11/1992 |
| EP | 0 999 689 A1 | 5/2000 |
| JP | 7123145 A | 5/1995 |

OTHER PUBLICATIONS

Copy of International Search Report mailed Feb. 12, 2001.
Sen M. Kuo et al., "Acoustic Noise and Echo Cancellation Microphone System for Videoconferencing", IEEE Transactions on Consumer Electronics 41 (1995) Nov., No. 4, New York, U.S., pp. 1149–1158.
Shoji Makino et al., "Acoustic Echo Canceller Algorithm Based on the Variation Characteristics of a Room Impulse Response", NTT Human Interface Laboratories 3–9–11, Midori–cho, Musashino–shi, Tokyo 180, Japan, pp. 1133–1136.
Neil J. Bershad, "Saturation Effects in LMS Adaptive Echo Cancellation for Binary Data", IEEE Transactions on Acoustics Speech and Signal Processing, vol. 38, No. 10, Oct. 1990, pp. 1687–1696.

* cited by examiner

*Primary Examiner*—Ricky Ngo
(74) *Attorney, Agent, or Firm*—Coats & Bennett, P.L.L.C.

(57) ABSTRACT

In handsfree communications devices including a linear echo or noise canceler, both analog and digital gain factors are adjusted in response to user volume control inputs, the analog gain factor being frozen during active communications (e.g., during telephone calls). By providing dual user controls, one of which is disabled when a call is in progress, embodiments of the invention provide the wide dynamic range required in most handsfree applications without degrading performance of the linear echo canceler.

18 Claims, 3 Drawing Sheets

METHODS AND APPARATUS FOR PROVIDING VOLUME CONTROL IN COMMUNICATING SYSTEMS INCLUDING A LINEAR ECHO CANCELER

FIELD OF THE INVENTION

The present invention relates to communications systems, and more particularly, to volume control in communications systems including one or more linear cancelation devices.

BACKGROUND OF THE INVENTION

Many bi-directional communications systems of today utilize some form of echo and/or noise suppression. For example, many handsfree telephones now include a linear echo canceler to prevent loudspeaker output from being fed back to a proximate microphone, as such feedback can be annoying or even intolerable to a far-end telephone user. U.S. patent application Ser. No. 09/005,145, filed Jan. 9, 1998 and entitled Methods and Apparatus for Providing Comfort Noise in Communications Systems, includes a detailed description of the implementation and advantages of such echo cancelation.

In addition to echo and noise suppression, loudspeaker volume control is also an important design consideration in the context of handsfree telephony. For typical applications, the loudspeaker volume control signal must compensate for a variety of factors, including component gain tolerances on both the transmitting and receiving sides of a communications link (typically in the range of +/−10 dB), voice power differences between human users (from −13 dB for a soft female to +8 dB for a loud male relative to a nominal male voice), varying loudspeaker distances across different installations (typically +/−12 dB for a 10–160 cm range in an automobile), and changes in background noise (typically 0–12 dB compensation for an automobile). When all such gain variations are considered, a volume control range of 77 dB is conceivable.

In conventional handsfree equipment, volume control is performed exclusively in the analog domain. In other words, a single adjustable-gain analog multiplier, or programmable gain amplifier (PGA), is used to adjust the amplitude of an analog loudspeaker feed signal. However, typical programmable gain amplifiers have nowhere near 77 dB of dynamic range. More often, programmable gain amplifiers include a dynamic range on the order of 20–25 dB.

While such range is perhaps sufficient for handheld applications (where the loudspeaker is at a fixed location relative to the user's ear, and where the telephone body blocks out most background noise from the user's ear), it is usually quite insufficient for handsfree applications, especially in automobiles. As a result, the telephone user experiences the product as not loud enough for a soft female voice in a noisy car with the loudspeaker at the farthest supported distance, or as too loud for a strong male voice in a quiet car with the loudspeaker at the closest supported distance, or both.

To compensate for this problem, some digital handsfree telephones of today include both analog and digital volume control. Such phones not only provide an adjustable-gain analog multiplier for the analog loudspeaker feed signal, but also include an adjustable-gain digital multiplier for adjusting the corresponding digital audio signal prior to digital-to-analog conversion. Consequently, these phones could provide an overall dynamic range more on the order of the above described 77 dB requirement.

Irrespective of whether the telephone employs analog-only volume control or dual analog and digital volume control, however, conventional volume control techniques can have a deleterious effect on telephone operation. For example, conventional techniques can lead to analog and/or digital signal clipping which can in turn significantly degrade the performance of a linear echo canceler. Moreover, analog gain changes made during a telephone call cause a linear echo canceler to retrain and therefore also result in periods of reduced echo cancelation.

Consequently, there is a need for improved techniques for providing volume control in communications devices incorporating a linear canceler.

SUMMARY OF THE INVENTION

The present invention fulfills the above-described and other needs by providing volume control techniques, wherein both analog and digital multipliers are used to adjust a loudspeaker input signal, and wherein analog volume adjustments are disabled during telephone calls. According to the invention, user adjustments to both the digital and analog gains are permitted when no call is in progress (e.g., during standby mode or at telephone installation), but only adjustments to the digital gain are permitted during a call. By providing dual (digital and analog) user controls, one of which is disabled when a call is in progress, embodiments of the invention provide the wide dynamic range required in handsfree applications while avoiding the pitfalls associated with conventional techniques. For example, volume adjustments made in accordance with the invention do not degrade linear echo canceler performance.

In an exemplary embodiment, a bi-directional communications device according to the invention includes a near-end signal processing path and a far-end signal processing path, the far-end signal processing path including a digital-domain multiplier and an analog-domain multiplier, and an echo canceler receiving a far-end digital reference signal from the far-end signal processing path and providing an echo estimate to the near-end signal processing path. According to the embodiment, both an analog gain factor of the analog-domain multiplier and a digital gain factor of the digital-domain multiplier are adjustable in dependence upon user input when users of the device are not communicating with one another via the device. However, when users of the device are communicating with one another via the device, the analog gain factor of the analog-domain multiplier is fixed while the digital gain factor of the digital-domain multiplier remains adjustable in dependence upon user input.

An exemplary method of processing signals in a telephone, the telephone including near-end and far-end signal processing paths and an echo canceler, and the far-end signal processing path including a digital domain multiplier and an analog domain multiplier, includes the steps of determining whether a telephone call is in progress, permitting adjustments of both a digital gain of the digital domain multiplier and an analog gain of the analog domain multiplier when the determination is negative, and permitting adjustments of the digital gain while blocking adjustments of the analog gain when the determination is affirmative.

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

DETAILED DESCRIPTION OF THE INVENTION

Figure 1:
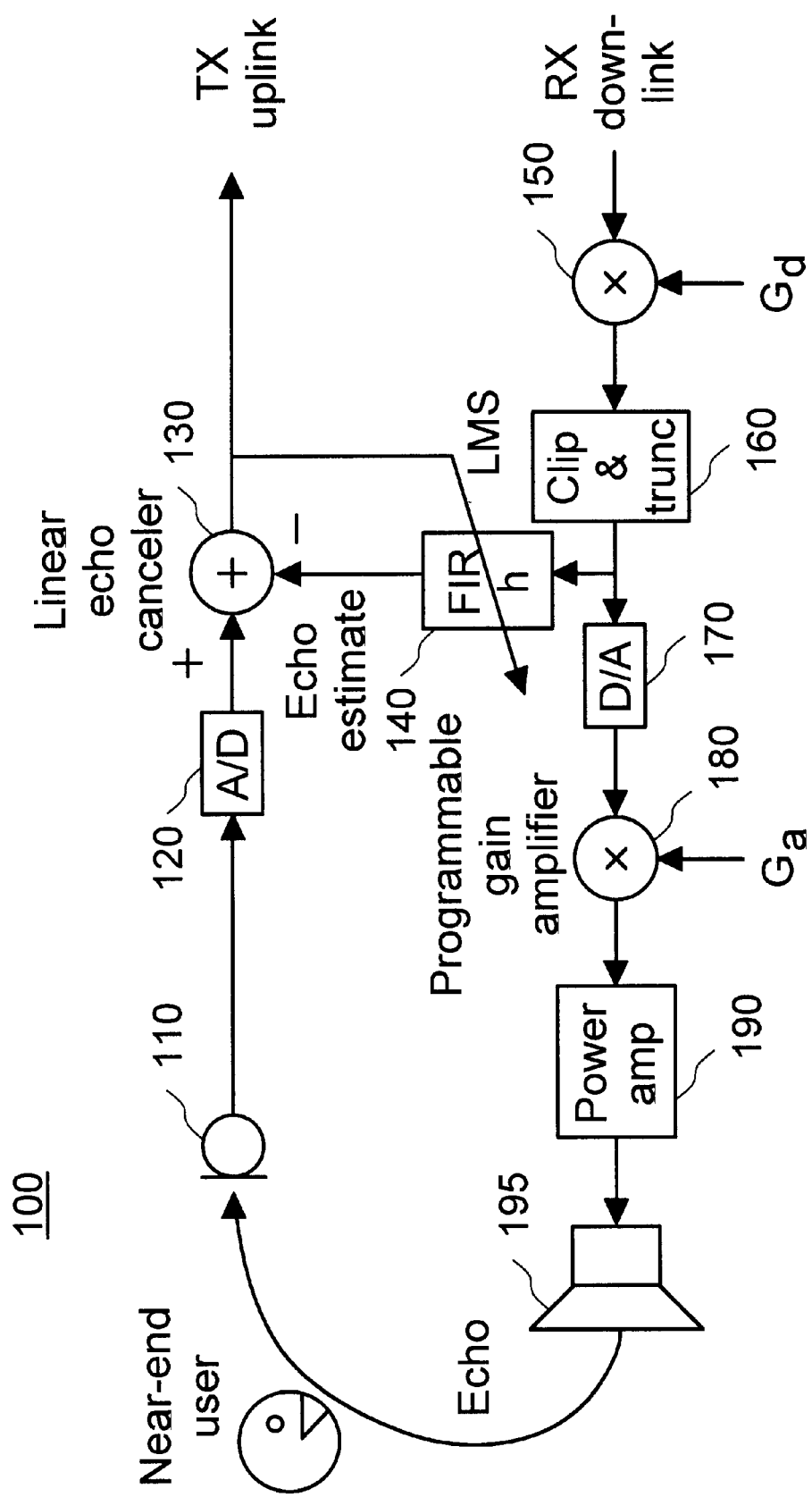
FIG. 1 is a block diagram of an exemplary communications device in which the volume control techniques of the invention can be implemented.

FIG. 1 depicts a bi-directional communications device 100 (e.g., a handsfree telephone) in which the volume control techniques of the invention can be implemented. As shown, the exemplary communications device 100 includes a microphone 110, an analog-to-digital converter 120, an echo canceler including a summing device 130 and a finite impulse response (FIR) filter 140, an adjustable-gain digital multiplier 150, a clipping and truncation processor 160, a digital-to-analog converter 170, an adjustable-gain analog multiplier 180, a power amplifier 190, and a loudspeaker 195. Those of skill in the art will appreciate that the below described functionality of the components of FIG. 1 can be implemented using a variety of hardware configurations, including a general purpose digital computer, standard digital signal processing components, and one or more application specific integrated circuits (ASICs). In practice, the analog-to-digital converter 120, the digital-to-analog converter 170, and the adjustable-gain analog multiplier 180 are typically combined in a single integrated circuit which is referred to in the art as a codec.

In FIG. 1, an analog audio output of the microphone 110 is coupled to an input of the analog-to-digital converter 120, and an output of the analog-to-digital converter 120 is coupled to an additive input of the summing device 130. An output of the summing device 130 is fed back to a control input of the FIR filter 140 and serves as a digital audio output for the communications device (e.g., for transmission across the air interface for presentation to a far-end user).

Additionally, a digital audio input (e.g., a far-end signal received via the air interface) is coupled to an input of the adjustable-gain digital multiplier 150, and an output of the adjustable-gain digital multiplier 150 is coupled to an input of the clipping and truncation processor 160. An output of the clipping and truncation processor 160 is coupled to an audio input of the FIR filter 140 and to an input of the digital-to-analog converter 170. An output of the digital-to-analog converter 170 is coupled to an input of the adjustable-gain analog amplifier 180, and an output of the adjustable-gain analog amplifier 180 is coupled to an input of the power amplifier 190. An output of the power amplifier 190 is coupled to an input of the loudspeaker 195 for presentation to a near-end user of the communications device 100.

In operation, the microphone 110 picks up near-end user speech, near-end background noise and echo from the loudspeaker 120. The resulting analog microphone output signal is then converted to the digital domain, via the analog-to-digital converter 120, and fed to the additive input of the summing device 130. Additionally, a digital estimate of the loudspeaker echo is fed to the subtractive input of the summing device 130 and removed, or canceled, from the digital microphone signal to provide an echo-canceled near-end signal for transmission.

At the same time, a digital far-end signal is received and amplified by a user-adjustable digital gain factor $G_d$ via the analog multiplier 150. The amplified analog signal is then clipped and truncated, via processor 160, and fed to both the FIR filter 140 and the digital-to-analog converter 170. Clipping and truncation ensures that the digital signal matches the dynamic range and number of bits of the digital-to-analog converter 170, as is well known in the art. The digital-to-analog converter 170 then translates the clipped and truncated signal to the analog domain, and the FIR filter 140 processes the clipped and truncated signal to provide the echo estimate. Output of the digital-to-analog converter 170 is amplified by a user-adjustable gain factor $G_a$, via the analog multiplier 180, and the resulting amplified analog signal is fed through the power amplifier 190 and to the loudspeaker 195 for presentation to the near-end user.

A detailed description of operation of the FIR filter 140 is provided in the above cited U.S. patent application Ser. No. 09/005,145. Briefly, filter coefficients or taps of the FIR filter 140 are dynamically adjusted in accordance with an adaptive algorithm (e.g., the well known Least Mean Squares or Normalized Least Mean Squares algorithms) so that the transfer function of the filter 140 continually tracks that of the analog echo path (i.e., the path from the digital-to-analog converter 170, through the amplifiers 180, 190 and the loudspeaker 120, back through the microphone 110, and to the analog-to-digital converter 120). Thus, output of the FIR filter 120 is an approximation of the echo component of the microphone output signal.

However, upon system initialization, and whenever the echo path changes (e.g., when the near-end user moves), a finite-duration training period will elapse before the filter transfer function closely matches the echo path (and thus before the echo estimate is a good approximation of the true echo). Also, any signal non-linearities introduced by the analog components in the echo path (e.g., analog clipping introduced by the power amplifier 195) will cause the echo canceler to train falsely and can therefore result in an echo estimate of poor quality.

According to the invention, the digital and analog gain factors $G_d$, $G_a$ are adjusted via separate near-end user volume controls (e.g., using designated volume control keys or by selecting menu options on a telephone display). This is in contrast to conventional handsfree devices in which volume control is accomplished using a single analog multiplier (e.g., the multiplier 180 of FIG. 1). In such conventional systems, the digital multiplier 150 and the signal conditioning processor 160 are omitted, and no digital clipping occurs. Moreover, truncation occurs only when the digital-to-analog converter (e.g., the converter 170 of FIG. 1) has fewer bits than the received digital signal. Thus, the conventional approach minimizes distortion by utilizing the entire range of the digital-to-analog converter for all volume settings.

However, as is noted in the above Background of the Invention, the conventional approach fails to provide adequate dynamic range for many handsfree applications. Additionally, while typical volume controls in the analog domain provide good linearity for a nominal signal at the nominal volume control setting, peak signals often get clipped at higher volume settings. Such analog clipping represents a severe non-linearity for the echo canceler and, as described above, causes a degradation in echo canceler performance. The result for the far-end user is that echo cancelation is lessened for peak far-end signals (i.e., precisely when echo suppression is most needed), the degradation lasting for some time after each peak signal as the echo canceler recovers after having falsely trained on the temporarily non-linear echo path.

Note also that a change in the analog gain factor $G_a$ represents a change in the overall echo path gain.

Consequently, the echo canceler must retrain each time the analog gain factor $G_a$ is adjusted. When such changes are made during a telephone call, the far-end user will hear degraded echo suppression until the retraining is complete. This can be particularly annoying when it happens several times during a call, as the near-end user repeatedly changes the volume control. While it is possible for the echo canceler to instantaneously rescale its coefficients to offset a change in volume, typical tolerances for programmable gain amplifiers make such an approach impractical. For example, a 2 dB (25.9%) error in the analog gain can degrade the echo suppression to worse than 11.7 dB (100/25.9).

Another problem associated with making analog gain changes during a call relates to the programming operation of many of today's codecs. Specifically, the programmable analog gain setting for many codecs can be changed only during a programming mode of operation following a codec reset. In other words, once such a codec is set to data mode (i.e., normal running mode), it must be reset before the programmable gain setting can be changed. Such resetting of the codec reduces the overall quality of performance for the near-end user, as each change in volume results in a drop-out in loudspeaker audio.

More recent telephones have included both analog and digital volume controls to address the above described deficiency relating to dynamic range. In other words, such phones include both a digital multiplier and an analog multiplier (e.g., the multipliers 150, 180 of FIG. 1) so that volume control can be used to compensate for a broader range of sound variation. However, such telephones still suffer from the above described deficiencies relating to analog gain changes (i.e., echo canceler performance degradations due to analog clipping and mid-call gain adjustments, as well as loudspeaker dropouts due to resetting of a codec).

Advantageously, embodiments of the invention avoid all of the above described problems by utilizing both the digital and analog multipliers 150, 180 for volume control generally, while permitting only digital gain changes during a call. Since changes in the digital gain factor $G_d$ do not affect the echo path gain between the loudspeaker reference signal and the digitized microphone signal (i.e., between the input to the digital-to-analog converter 170 and the output from the analog-to-digital converter 120), the echo canceler never needs to retrain during a call as a result of volume control adjustments. Thus, the far-end user does not perceive degradation of the echo cancelation during a call. Moreover, since the analog gain factor $G_a$ is constant during a call, the codec need not be reset and reprogrammed, and the near-end user does not perceive drop-outs in the loudspeaker audio.

Figure 2:
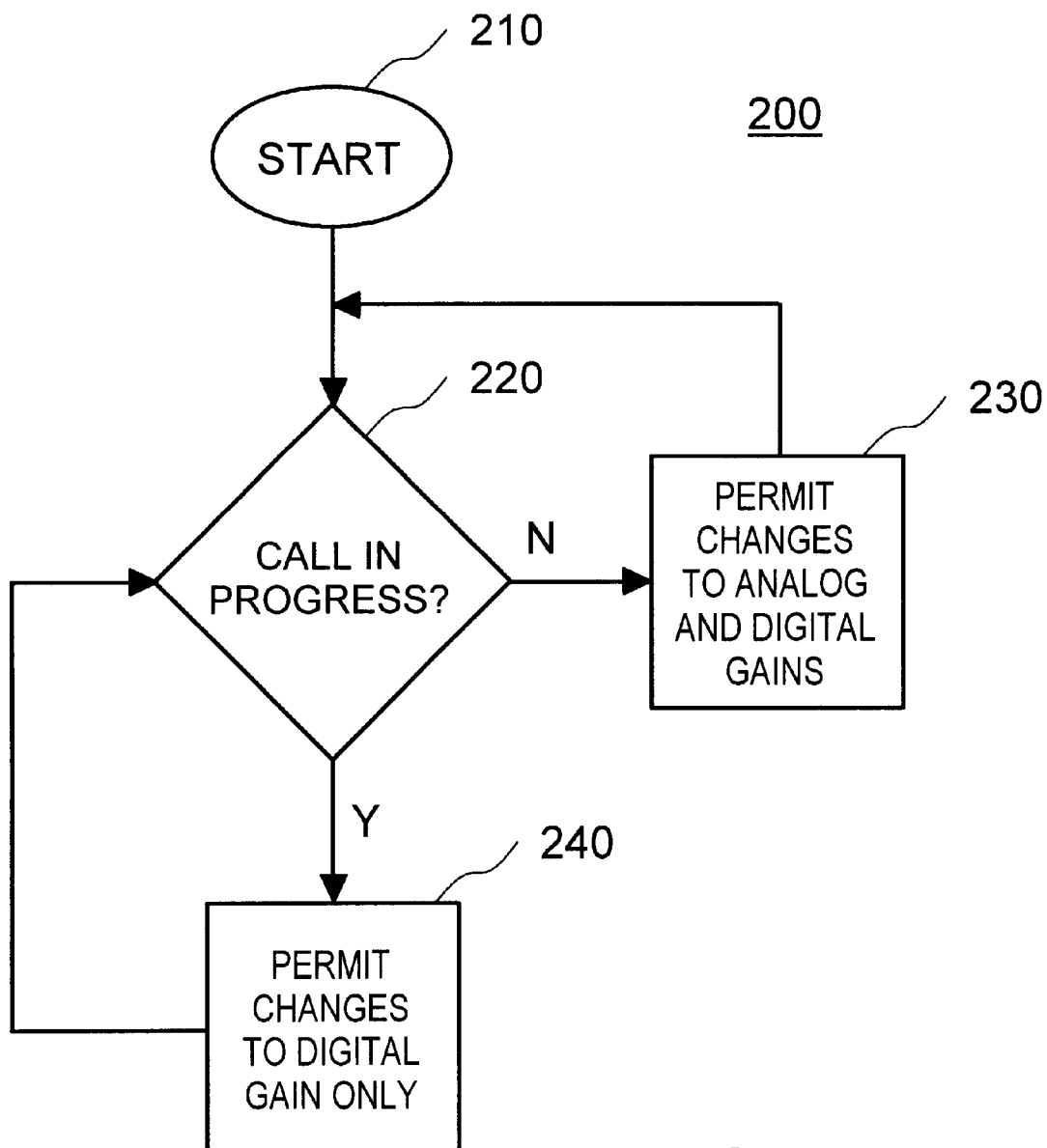
FIGS. 2 and 3 are flow diagrams depicting steps in exemplary volume control algorithms according to the invention.

FIG. 2 depicts steps in an exemplary method 200 incorporating the above described aspects of the invention. The method 200 can be implemented, for example, via a volume control processor within the handsfree device 100 of FIG. 1 (i.e., a processor which receives user inputs, for example via a volume control key and/or a display menu, and adjusts the analog and digital gain factors $G_a$, $G_d$ accordingly).

In the figure, the exemplary method 200 begins at step 210 (e.g., upon powering up of the device 100), and at step 220 a determination is made as to whether a call is in progress. If not, then changes to both the analog and digital gain factors $G_a$, $G_d$ are permitted at step 230, and processing returns to step 220. If a call is in progress, however, then only changes to the digital gain factor $G_d$ are permitted at step 240, and processing again returns to step 220. The process 200 then repeats indefinitely (e.g., until the device 100 is powered down).

According to the invention, the analog gain factor $G_a$ can be used to make coarse volume adjustments (e.g., to compensate for factors that will be constant for a particular telephone and/or a particular installation, such as telephone receiver gain and loudspeaker distance from the near-end user), while the digital gain factor $G_d$ can be used to make finer volume changes (e.g. to compensate for variable factors, including near-end background noise and far-end user speech levels). By permitting coarse analog gain adjustments only when the telephone is idle (i.e., when no call is in progress), and by permitting finer digital gain adjustments at any time, a telephone constructed according to the invention can provide a wide dynamic range without introducing the above described problems relating to echo canceler degradation and loudspeaker audio dropout.

Advantageously, the analog gain factor $G_a$ can be adjusted in a number of ways. For example, the analog gain factor $G_a$ can be set manually during telephone installation or re-calibration (e.g., via a menu option on the telephone display). Thereafter, the digital gain factor $G_d$ alone is used to compensate for variations in the received signal and/or the prevailing background noise (e.g., via a designated telephone key, button, or other suitable input mechanism).

Alternatively, adjustment of the analog gain factor $G_a$ can be automated based on the volume habits of the near-end user. In other words, changes to the analog gain factor $G_a$ can be made between calls based on a habit-tracking algorithm which determines how the user typically sets the volume (i.e., the digital gain factor $G_d$) during calls. Advantageously, such automation provides an optimum coarse volume setting without requiring input of the user at installation.

Figure 3:
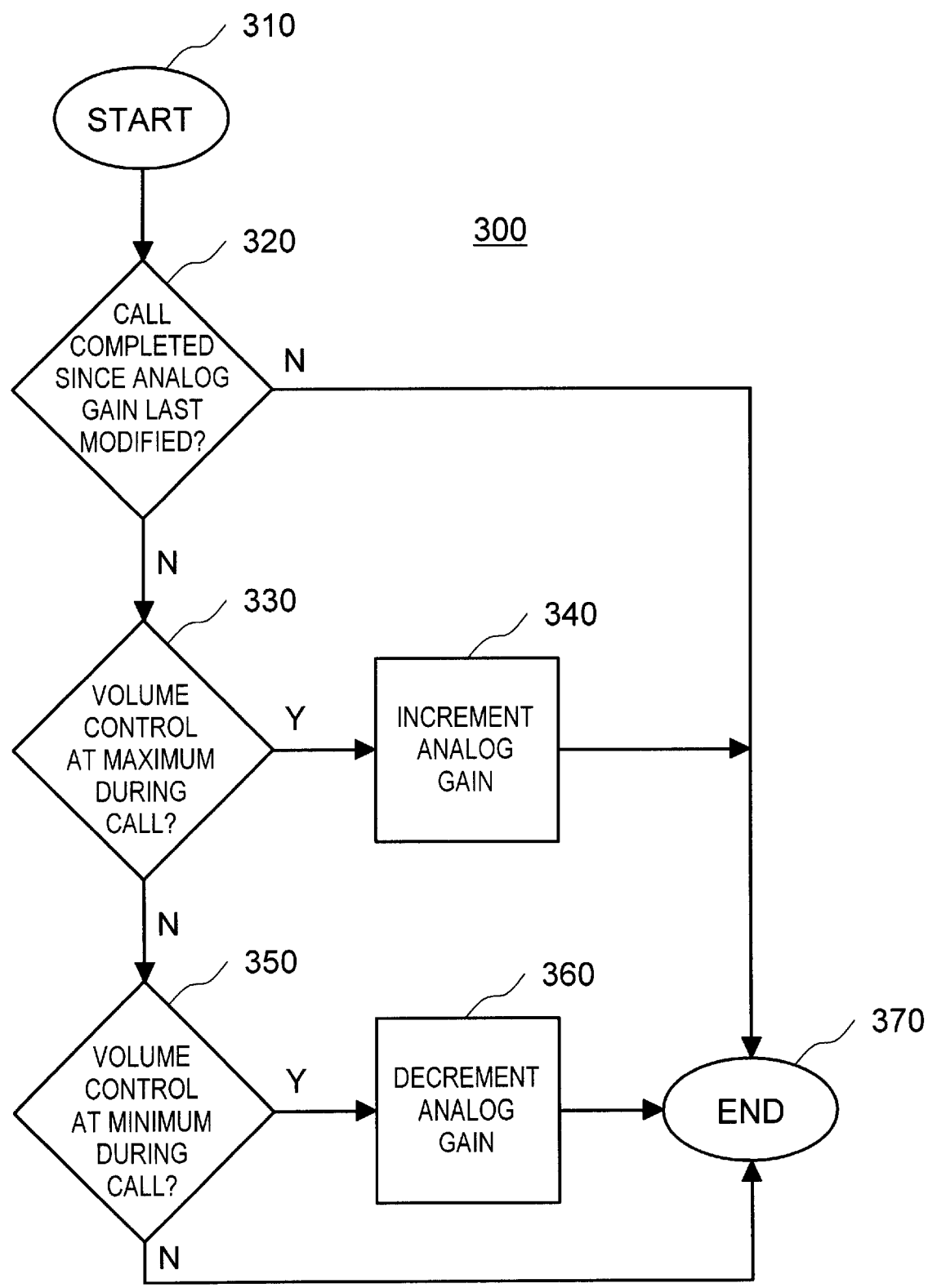
Figure 3:
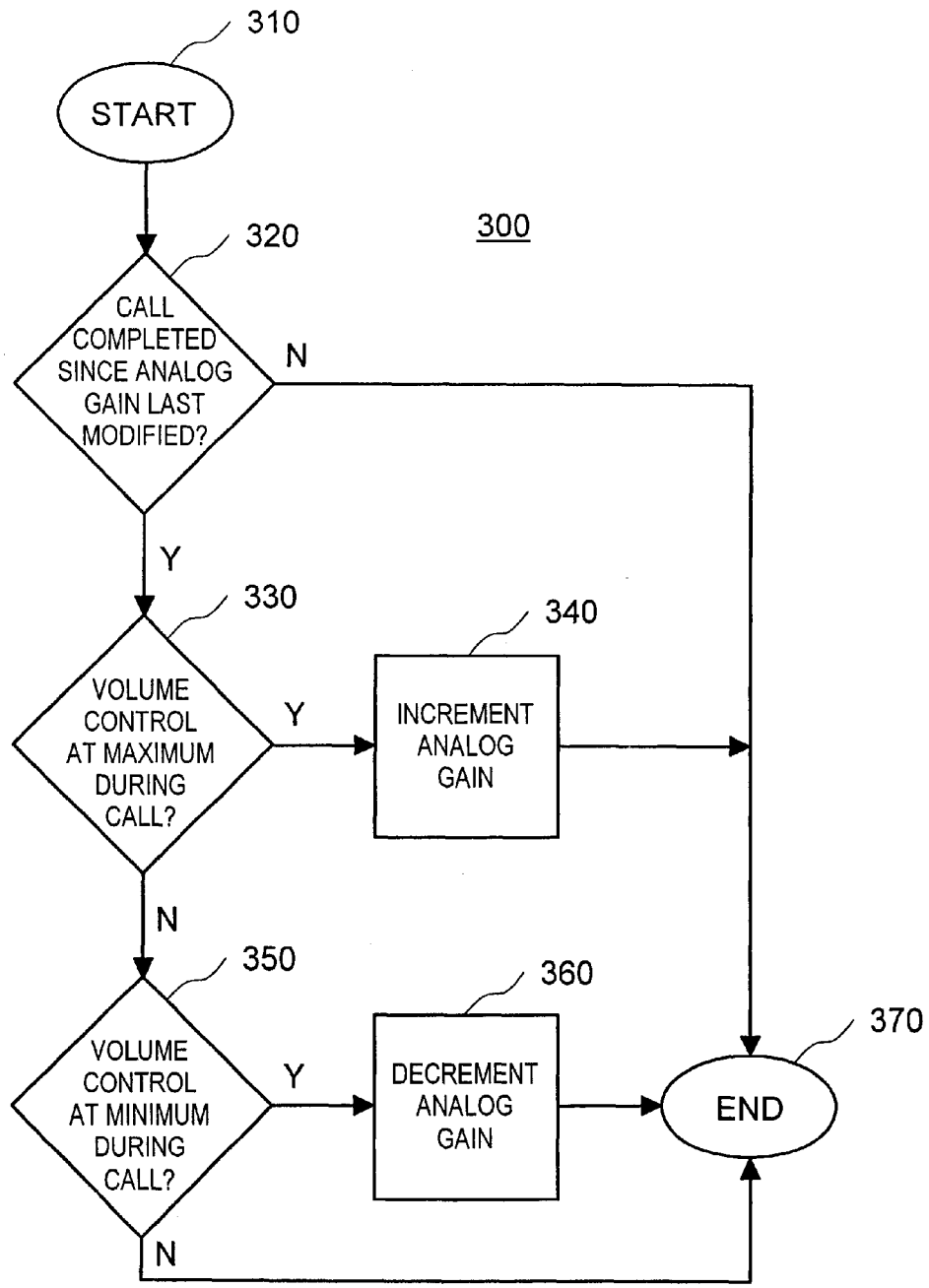

An exemplary habit-tracking algorithm according to the invention steps the analog gain factor $G_a$ up or down when the user consistently uses, respectively, the highest or lowest range of the digital volume control. FIG. 3 depicts an example of such a method of habit tracking. The exemplary method 300 can be implemented, for example, via a volume control processor within the handsfree device 100 of FIG. 1.

In the figure, processing begins at step 310 (e.g., upon powering up of the telephone 100 or at any other time when the telephone 100 is on but idle, perhaps at the conclusion of each call), and a determination is made at step 320 as to whether a call has been conducted since a last coarse volume adjustment (i.e., since a last change in the analog gain factor $G_a$). If not, then no coarse adjustment is made, and processing ends at step 370. However, if a call has been completed since a last coarse adjustment, then a determination is made at step 330 as to whether the digital volume control (i.e., the digital gain factor $G_d$) was kept in a maximum range during the call (indicating that the loudspeaker output was generally insufficient during the call).

If so, then the analog gain factor $G_a$ is incremented at step 340, and processing ends at step 370. Otherwise, a determination is made at step 350 as to whether the digital volume control was kept in a minimum range during the call (indicating that the loudspeaker output was generally too loud during the call). If so, then the analog gain factor $G_a$ is stepped down at step 360, and processing ceases at step 370. Otherwise, the analog gain factor $G_a$ is not changed, and processing ceases directly at step 370.

According to the invention, the analog gain factor $G_a$ can be set (manually or automatically) to minimize clipping and truncation distortion at the output of the conditioning processor 160. Note, however, that any distortion existing in the digital output of the conditioning processor 160 does not affect the echo path, and will thus not cause the echo canceler to diverge (i.e., falsely train away from the true echo transfer function).

In addition to freezing analog gain adjustments during a call, the present invention also discloses that signal non-linearities (and corresponding echo canceler degradations) can be avoided by calibrating the power amplifier 190 and the analog multiplier 180 (e.g., within a codec) such that clipping can never occur in the analog domain for any possible analog gain factor $G_a$. Advantageously, the analog gain calibration can also ensure that the power rating for the loudspeaker 195 is never exceeded under any possible signal conditions (as exceeding the power rating also introduces signal non-linearities).

The above described embodiments of the invention provide a number of advantages as compared to conventional volume control systems. For example, the analog gain factor $G_a$ can be lowered to reduce idle noise at the loudspeaker (such idle noise resulting, for example, from a sigma-delta digital-to-analog converter). This can be especially useful for installations where the loudspeaker is positioned close to the user's ear. By way of contrast to the invention, systems which use only a digital gain factor for volume control cannot provide this benefit.

Additionally, systems which use only a digital gain factor for volume control also suffer from increased quantization distortion as the volume decreases (as the digital signal occupies fewer bits of the digital-to-analog converter). By way of contrast, the invention utilizes the analog gain factor $G_a$ as well, and thereby allows the digital signal to fill the range of the digital-to-analog converter.

Moreover, systems which use only an analog gain factor for volume control often clip the analog audio signal at high volume settings. As noted above, this causes the echo canceler to diverge and be less effective. By way of contrast, the present invention allows the digital gain $G_d$ to be higher than unity, with digital-domain clipping that does not negatively affect the echo canceler.

Additionally, systems that use only an analog gain factor for user volume control cause the echo canceler to retrain and be less effective every time the volume control is changed by the user during a call. By way of contrast, the present invention only varies the digital gain factor $G_d$ during a call and thereby avoids mid-call divergence of the echo canceler.

Further, systems that use only an analog gain factor for volume control sometimes have negative implications for the codec. For example, to allow gain changes on the fly, such systems may require a data format that includes at least one control bit, thus reducing the number of bits available for the signal (which means increased distortion) and increasing complexity in the interface program. Also, as noted above, allowing gain changes on the fly may involve resetting the codec each time the gain is to be reprogrammed (resulting in dropouts in the loudspeaker audio). By way of contrast, the invention varies only the digital gain factor $G_d$ during a call, and thereby avoids such problems.

Those skilled in the art will appreciate that the present invention is not limited to the specific exemplary embodiments which have been described herein for purposes of illustration and that numerous alternative embodiments are also contemplated. For example, although the embodiments are described with respect to an acoustic echo canceler, the volume control techniques of the invention are equally applicable to network echo cancelers (which are used, for example, to cancel echoes resulting from impedance mismatches at hybrid junctions between digital devices and analog networks). The scope of the invention is therefore defined by the claims appended hereto, rather than the foregoing description, and all equivalents which are consistent with the meaning of the claims are intended to be embraced therein.

What is claimed is:

1. A bi-directional communications device, comprising:
    a digital multiplier receiving a far-end digital input signal and scaling the far-end digital input signal by a digital gain factor to provide a far-end digital reference signal;
    a digital-to-analog converter receiving the far-end digital reference signal and processing the far-end digital reference signal to provide a far-end analog reference signal;
    an analog multiplier receiving the far-end analog reference signal and scaling the far-end analog reference signal by an analog gain factor to provide a far-end analog output signal for presentation to a near-end user;
    an analog-to-digital converter receiving a near-end analog input signal and digitizing the near-end analog input signal to provide a near-end digital input signal, the near-end digital input signal including an echo component resulting from coupling of the far-end analog output signal through an echo path to the analog-to-digital converter; and
    a linear echo canceler receiving the far-end digital reference signal, processing the far-end digital reference signal to provide an estimate of the echo component of the near-end digital input signal, and subtracting the estimate from the near-end digital input signal to thereby provide an echo-canceled near-end digital output signal for presentation to a far-end user,
    wherein both the analog gain factor and the digital gain factor are variable in dependence upon near-end user input when the near-end and far-end users are not communicating with one another via the device, and wherein the analog gain factor is fixed and the digital gain factor is variable in dependence upon near-end user input when the near-end and far-end users are communicating with one another via the device.

2. The communications device of claim 1, wherein said communications device is a telephone and wherein the analog gain factor is fixed during calls between the near-end and far-end users.

3. The communications device of claim 2, wherein said linear echo canceler is an acoustic echo canceler.

4. The communications device of claim 3, wherein the far-end analog output signal is amplified and fed to a loudspeaker for presentation to the near-end user, and wherein the echo component of the near-end digital input signal results from acoustic coupling between the loudspeaker and a near-end microphone.

5. The communications device of claim 2, wherein said linear echo canceler is a network echo canceler.

6. The communications device of claim 5, wherein the far-end analog output signal is fed to a hybrid junction for transmission across a network to the near-end user, and wherein the echo component of the near-end digital input signal results from an impedance mismatch at the hybrid junction.

7. The communications device of claim 1, wherein the analog gain factor is adjusted during calibrations of said device and fixed otherwise.

8. The communications device of claim 1, wherein the analog gain factor is automatically adjusted between successive user communications.

9. The communications device of claim 8, wherein adjustment of the analog gain factor is based upon volume control habits of the near-end user.

10. The communications device of claim 9, wherein the analog gain factor is incrementally increased following communications during which a near-end volume control signal is maintained at a maximum level.

11. The communications device of claim 9, wherein the analog gain factor is incrementally decreased following communications during which a near-end volume control signal is maintained at a minimum level.

12. The communications device of claim 1, wherein the far-end digital reference signal is clipped and truncated prior to being input to said digital-to-analog converter and to said linear echo canceler, and wherein the analog gain factor is fixed during communications so as to minimize clipping and truncation distortion of the far-end digital reference signal.

13. The communications device of claim 1, wherein the far-end analog output signal is amplified via a power amplifier prior to presentation to the near-end user, and wherein the power amplifier and the analog multiplier are calibrated in tandem to prevent analog clipping during user communications.

14. The communications device of claim 1, wherein said linear echo canceler is a Least Mean Squares echo canceler.

15. The communications device of claim 1, wherein said linear echo canceler is a Normalized Least Mean Squares echo canceler.

16. A bi-directional communications device, comprising:
    a near-end signal processing path and a far-end signal processing path, the far-end signal processing path including a digital-domain multiplier and an analog-domain multiplier; and
    an echo canceler receiving a far-end digital reference signal from the far-end signal processing path and providing an echo estimate to the near-end signal processing path,
    wherein both an analog gain factor of said analog-domain multiplier and a digital gain factor of said digital-domain multiplier are adjustable in dependence upon user input when users of said device are not communicating with one another via the device, and
    wherein the analog gain factor of said analog-domain multiplier is fixed and the digital gain factor of said digital-domain multiplier is adjustable in dependence upon user input when users of said device are communicating with one another via the device.

17. A method of processing bidirectional communication signals, comprising the steps of:
    fixing a value of an adjustable analog gain factor;
    receiving a far-end digital input signal;
    multiplying the far-end digital input signal by an adjustable digital gain factor to provide a far-end digital reference signal;
    translating the far-end digital reference signal to the analog domain to thereby provide a far-end analog reference signal;
    multiplying the far-end analog reference signal by the fixed-value analog gain factor to provide a far-end analog output signal;
    receiving a near-end analog input signal, the near-end analog input signal including an analog echo component resulting from coupling of the far-end analog output signal through a near-end echo path;
    digitizing the near-end analog input signal to provide a near-end digital input signal, the near-end digital input signal including a digital echo component corresponding to the analog echo component of the near-end analog input signal;
    processing the far-end digital reference signal to provide an estimate of the digital echo component of the near-end digital input signal; and
    subtracting the estimate of the digital echo component from the near-end digital input signal to provide a near-end digital output signal.

18. A method of processing signals in a telephone, the telephone including near-end and far-end signal processing paths and an echo canceler, the far-end signal processing path including a digital domain multiplier and an analog domain multiplier, the method comprising the steps of:
    determining whether a telephone call is in progress;
    permitting adjustments of a digital gain of the digital domain multiplier and permitting adjustments of an analog gain of the analog domain multiplier when said determination is negative; and
    permitting adjustments of the digital gain of the digital domain multiplier and blocking adjustments of the analog gain of the analog domain multiplier when said determination is affirmative.

* * * * *

UNITED STATES PATENT AND TRADEMARK OFFICE
CERTIFICATE OF CORRECTION

PATENT NO.    : 6,487,178 B1
DATED         : November 26, 2002
INVENTOR(S)   : Romesburg et al.

It is certified that error appears in the above-identified patent and that said Letters Patent is hereby corrected as shown below:

Drawings,
Figure 3, the line from "block 320 to block 330" should have a -- Y -- next to it instead of the "N".

Column 3,
Line 57, "120" should be -- 190 --.
Line 67, both "analog" words should be -- digital --.

Column 4,
Line 24, "120" should be -- 140 --.
Line 33, "195" should be -- 190 --.
Line 36, "t o" should be -- to --.

Signed and Sealed this

Twenty-third Day of September, 2003

JAMES E. ROGAN
*Director of the United States Patent and Trademark Office*